June 18, 1963 I. B. OSOFSKY 3,093,968
METHOD AND APPARATUS FOR AUGMENTING THE DRIVE OF A GAS TURBINE
Filed May 5, 1960 2 Sheets-Sheet 1
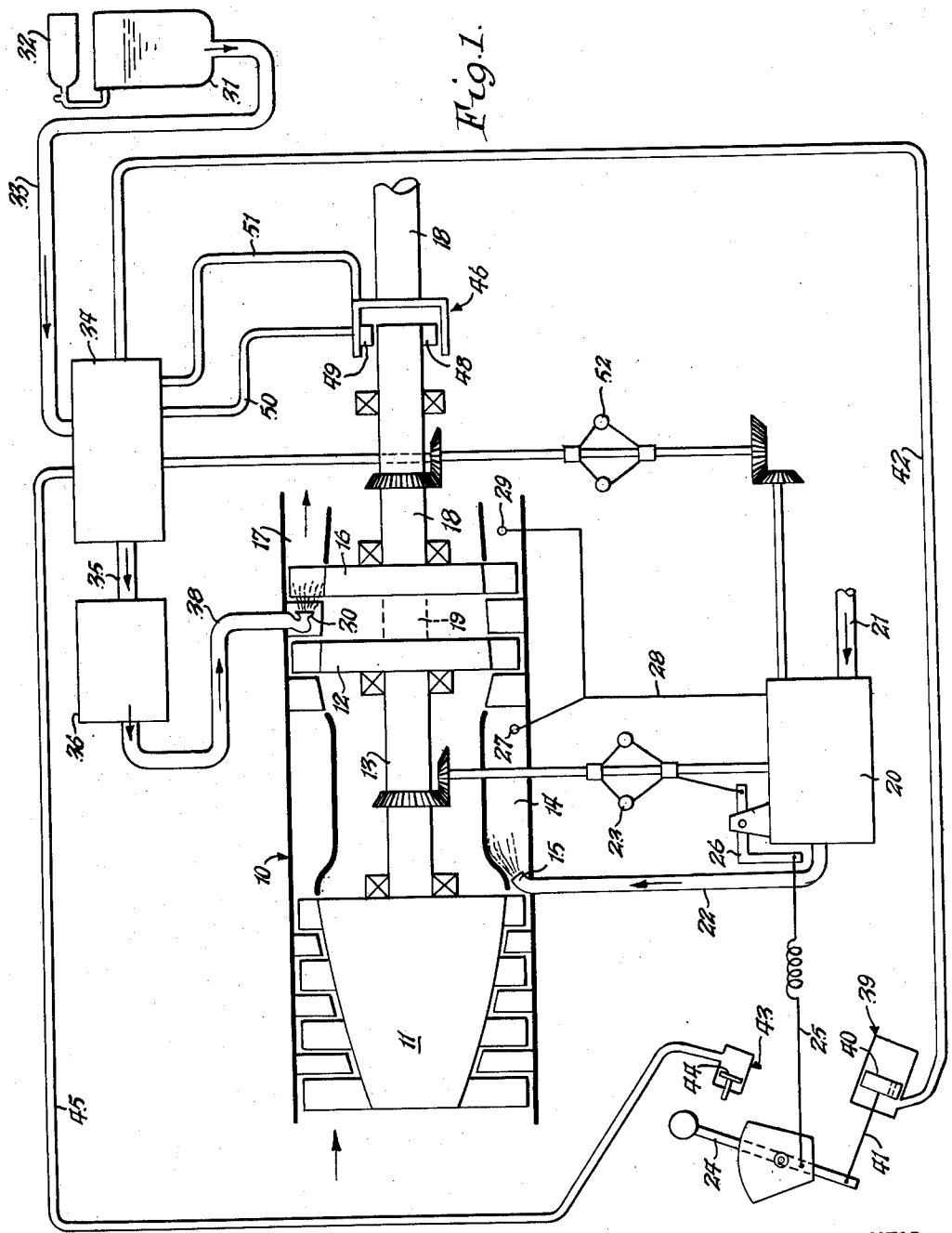
INVENTOR.
Irving B. Osofsky
BY
Popp and Sommer
ATTORNEYS

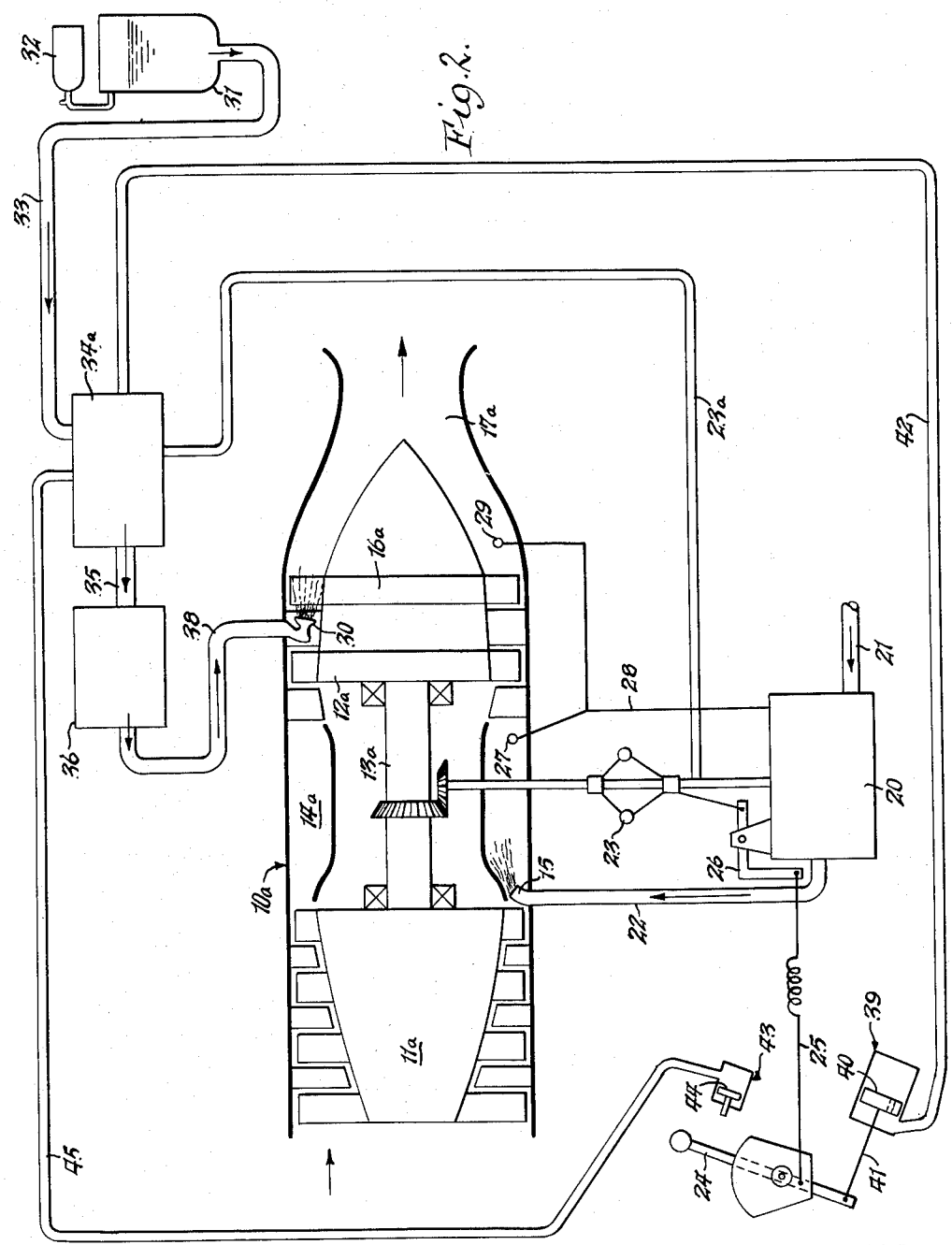

United States Patent Office 3,093,968
Patented June 18, 1963

3,093,968
METHOD AND APPARATUS FOR AUGMENTING THE DRIVE OF A GAS TURBINE
Irving B. Osofsky, Cheektowaga, N.Y., assignor to Cornell Aeronautical Laboratory, Inc., Buffalo, N.Y., a corporation of New York
Filed May 5, 1960, Ser. No. 27,182
8 Claims. (Cl. 60—39.21)

This invention relates to a method and apparatus for augmenting the drive of a gas turbine.

Gas turbines have now become accepted as the main power plant for existing and proposed aircraft, including fixed-wing airplanes, helicopters and vertical takeoff and landing vehicles. A gas turbine used as an aircraft engine possesses the advantages of favorable power to weight and power to size ratios. In addition, a gas turbine engine can deliver continuously a very high percentage of maximum power without an excessive penalty on life and reliability.

A gas turbine used as an aircraft engine, however, has a number of shortcomings which are not likely to be overcome by mechanical refinements. These include: power loss on a hot day; power loss with increasing altitude; poor response to throttle change; lack of emergency power and difficulty of and long time required for starting.

The temperature of the inlet air to the compressor of a gas turbine affects the compressor power required, the temperature rise during combustion and, of course, mass flow. Engine power available decreases with an increase in ambient temperature. The performance of a gas turbine powered helicopter, for example, is severely limited on a hot day. In particular, under hot conditions, the helicopter often cannot perform missions which require hovering and vertical climbing with normal gross weight.

Unlike the supercharged, reciprocating aircraft engine, the gas turbine engine has no acceptable means of compensating for the decrease in power that attends an increase in altitude. The altitude affects the density of the inlet air and the mass flow. Since many airfields are at altitudes considerably above sea level, especially in the western United States, the performance of helicopters having a gas turbine engine, for example, operating from these fields is often compromised. Payloads become smaller as altitudes increase.

As a result of the basic aerodynamics and thermodynamics of the gas turbine cycle and because of the large rotational inertia of the compressor-turbine-gearbox-rotor combination, the gas turbine reacts rather slowly to large or sudden throttle demands. Under emergency conditions, such as sudden avoidance of an obstacle, failure of one engine during takeoff or landing, and other situations which can be visualized, this throttle response time may exceed the time increment necessary to save the pilot and aircraft.

As used in this specification and the appended claims, the term "gas turbine" includes not only turboshaft engines but also turbojet engines. Turboshaft engines are of two types. In one, known as the free turbine engine, the second stage or mechanical power output turbine wheel which is fast to an output shaft, is not physically connected to the first stage or gas generator turbine wheel. The other type of turboshaft engine, which may be termed a fixed turbine engine, has one turbine wheel to turn the compressor and another to deliver mechanical power but in this type the two turbine wheels are rigidly coupled together.

In the case of a gas turbine engine, one of its major structural limitations is the blade temperature-RPM limitation of its first stage turbine wheel. For certain ambient conditions, maximum power output is less than that which the engine is structurally capable of delivering, although this reduced power rating is obtained at maximum burner temperature and r.p.m. Therefore, a gas turbine engine cannot deliver any excess power under these conditions in an emergency.

The primary object of the present invention is to overcome the above mentioned disadvantages of the gas turbine engine by providing a method and apparatus for augmenting the drive of the engine which will require little structural change to the engine itself.

A further object is to provide a power augmentation system for a gas turbine aircraft engine which will not add excessive weight.

In accordance with the present invention, an auxiliary drive fluid, generated externally from the main drive fluid flowing through the turbine, is impinged directly against the blades of the turbine wheel. The resulting force at the periphery of the rotating turbine wheel will produce additional torque on demand. In the case of a turboshaft engine, the auxiliary drive fluid is directed preferably against the power output turbine wheel thereby converting the auxiliary drive to shaft power. In the case of a turbojet engine, the auxiliary drive fluid is directed against the gas generator turbine wheel which increases the rotational speed of the compressor connected thereto thereby increasing the thrust of the engine.

Although the present invention is concerned with augmenting the power or drive of a gas turbine engine once operating, an incidental advantage of the augmentation drive system is that it may be used to start the engine which demands considerable power for an appreciable time due to the inherent nature of the gas turbine starting cycle.

Other objects and advantages of the present invention will be apparent from the following detailed description and accompanying drawings in which:

FIG. 1 is a diagrammatic representation of a gas turbine engine of the turboshaft type with an illustrative augmentation drive system, embodying the principles of the present invention, shown operatively associated with the engine.

FIG. 2 is a similar diagrammatic representation but showing the inventive augmentation drive system operatively associated with a gas turbine engine of the turbojet type.

The turboshaft gas turbine engine shown in FIG. 1 is represented generally by the reference numeral 10. As is well understood by those skilled in the gas turbine art, it comprises a gas generator including an axial-flow compressor 11 and a gas generator or first stage bladed turbine wheel 12 drivingly connected to the compressor by a suitably journalled shaft 13, and a burner 14 into which a suitable fuel is introduced by the nozzle 15. Combustion air introduced through the inlet of the compressor 11, the left end as shown, is first compressed and then supports combustion in the burner of the fuel injected by the nozzle 15. The high temperature, high pressure gases so generated flow axially through the turbine passing over the blades of the turbine wheel 12. In this manner, this turbine wheel is driven which in turn drives the compressor 11. The hot gas or main drive fluid after some of its energy has been extracted by the turbine wheel 12, continues to flow axially from left to right as viewed in the figure and passes between the blades of a power or second stage turbine wheel 16 which is fast to a suitably journalled output shaft 18. This causes rotation of the turbine wheel 16 to drive the shaft 18. The gas flowing through the turbine is discharged through the exhaust duct 17.

In the case of a free turbine engine, the power turbine wheel 16 is not connected to the gas generator turbine wheel 12 so that these wheels may rotate at different speeds. On the other hand, the two turbine wheels 12 and 16 may be connected together, as suggested by the broken lines representing a coupling shaft 19, to provide a fixed turbine engine in which case these two turbine wheels rotate together at the same angular speed.

Fuel admitted to the burner 14 is shown controlled by a gas generator fuel control valve 20 of any suitable and well-known type. Fuel is supplied to this valve through an inlet pipe 21 connected to any suitable source of fuel such as a fuel tank (not shown). Fuel metered by the valve 20 flows through a pipe 22 connected to the nozzle 15.

Operation of the fuel valve 20 is controlled by a governor 23 operatively associated therewith and with the rotating shaft 13 in a manner well understood by those skilled in the art. The governor 23 may be of any suitable type, the mechanical type schematically shown being merely illustrative. The setting of the governor 23 is shown as adjusted by a manually operable pivoted throttle lever 24 suitably connected thereto as by tensioned cable 25 and pivoted lever 26. By moving the throttle lever 24 from left to right, for example, the tension of the governor is adjusted so as to require a higher rotational speed of the shaft 13 before the governor will shut off the fuel control valve 20. The effect will be the opposite if the throttle lever is moved from right to left. In this manner, it will be seen that the throttle lever 24 controls the speed of the gas generator section. The governor 23 is arranged to close the fuel control valve 20 when the speed of the shaft 13 reaches a predetermined maximum r.p.m., regardless of the setting of the throttle lever 24.

The fuel control valve 20 is also adapted to be closed when the temperature in the burner 14 reaches a predetermined maximum value. This is achieved by arranging a suitable temperature sensing device 27 in the burner chamber and operatively associating it with the valve 20 as indicated diagrammatically by the line 28. A branch line may also connect a second temperature sensing device 29 arranged in the exhaust duct 17 to the line 28 as shown. For example, each of the devices 27 and 29 may be a thermocouple arranged to feed a valve-closing signal to the valve 20 when the temperature reaches the predetermined maximum level.

Limiting the maximum speed of the gas generator section and the maximum temperature in the burner and exhaust duct is determined by the physical strength of the materials of construction under these conditions.

In accordance with the present invention, the power augmentation system comprises means for impinging a hot, very high velocity gas jet directly against the blades of the power turbine wheel 16 and which jet thereby serves to drive such wheel as an impulse turbine. To this end a nozzle 30 of the converging-diverging supersonic type is shown as arranged on the upstream side of the power turbine wheel 16. Instead, the nozzle 30 may be arranged to direct the auxiliary drive fluid tangentially against the turbine wheel 16 or at an angle thereto, as may be desired. Also, a plurality of nozzles such as 30 may be arranged at circumferentially spaced intervals around the periphery of the turbine wheel 16. The showing in the drawing is merely suggestive and schematic.

The means for supplying the auxiliary drive fluid to the nozzle 30 is shown as comprising a supply tank 31 containing liquid augmentation fuel maintained under pressure by a throttle 32 of pressurized gas. Augmentation fuel can flow from the reservoir 31 through a pipe 33 to a control valve 34. Augmentation fuel metered by the valve 34 passes through the pipe 35 into an auxiliary drive fluid generating chamber 36. The auxiliary drive fluid generated in the chamber 36 is conducted by the pipe 38 to the nozzle 30.

The augmentation fuel may be of any suitable type. It may be a monopropellant which is defined as one fluid which by itself produces hot gas, such as concentrated hydrogen peroxide, normal propyl nitrate, hydrazine, nitromethane, ethylene oxide. For example, concentrated hydrogen peroxide catalytically decomposes when brought in contact with silver, and normal propyl nitrate catalytically decomposes on contact with hot Nichrome wire. By arranging the catalyst in the chamber 36, monopropellant brought in contact with the catalyst in this chamber will decompose to provide the auxiliary drive fluid. A monopropellant as a hot gas source is preferred because use of a single fluid fuel simplifies the problem and allows the use of a single tank and pumping system. While bipropellants, meaning two fluid fuel components, may also be employed, the metering and storing of a bipropellant is necessarily more involved. As examples of bipropellants, red fuming nitric acid can be reacted with analine or hydrazine or alcohol. The two fluids of a bipropellant system can be brought into contact with each other in the chamber 36 for reaction together, or for combustion with or without the aid of an igniter (not shown).

It will thus be seen that the auxiliary drive fluid may be generated in the chamber 36 by catalytic decomposition or combustion or chemical reaction, as desired. It is also apparent that the specific augmentation fuel supply system shown is illustrative only.

The augmentation fuel control valve 34 is shown as being responsive to three principal control inputs.

One such control input is determined by the rate of change of the speed control throttle lever 24. This is achieved by operatively associating the throttle lever 24 to a transient response pickup 39 shown as a dashpot device, the orificed plunger 40 of which is connected to the end of the lever by a rod 41. A fluid pressure on one side of the plunger 40, variable in response to the rate of change of the position of the throttle lever 24, is applied as a control input to the control valve 34 via a pipe 42. Any other suitable type of rate sensor 39 may be used. It will be seen that the faster the throttle lever 24 is moved to a new position demanding a higher turbine speed, the higher the pressure in control line 42. Operation of control valve 34 is proportionately responsive to this control pressure so that the higher this pressure, the more the valve will open to provide auxiliary drive fluid.

The second control input is selective to give emergency power when desired. This is shown as achieved by an emergency power trip device 43 having a plunger 44 which when moved in one direction will pressurize a fluid in a pipe 45 leading to the control valve 34 which will open in response to this pressure. The trip device 43 which may be of any suitable type may be arranged to maintain the control valve 34 open as long as the device remains tripped, within the maximum permissible limits of turbine operation as later to be discussed.

The third control input is determined by the torque on the output shaft 18. For this purpose, this shaft is shown as having operatively associated therewith, a torque measuring device 46 which may be of any suitable type. The one shown diagrammatically is of the hydraulic type and is operatively interposed between split portions of the power output shaft 18. The hydraulic device 46 typically has a vane 48 fast to one shaft portion and a vane 49 fast to the other shaft portion. The vanes 48 and 49 are movable relative to each other. Fluid trapped between these vanes on one side of the device is under a pressure by reason of the tendency to relative movement between the output shaft portions connected respectively to drive and load. This pressurized fluid is applied to the control valve 34 via a pipe 50 so as to close the valve when the pressure rises to a predetermined maximum value which is proportionate to the maximum torque permissible for the power output shaft 18. Typically, this control limits emergency power to the shaft 18.

If the load demand on the output shaft 18 should suddenly decrease, the pressure of the fluid trapped between the vanes 48 and 49 on the other side of the device will rise since the relation between drive and load reverses in effect. This pressure is applied to the control valve 34 via a pipe 51 so as to close the valve when the pressure tends to rise above a predetermined level.

Thus lines 50 and 51 apply over-torque and under-torque signals, respectively, to the augmentation fuel control valve 34 and these signals when effective cause this valve to close and cut off the supply of auxiliary drive fluid to the nozzle 30. This is for the purpose of preventing breakage of the output shaft 18 in the case of over-torque, and the speeding up of the power turbine wheel 16 when the load demand is suddenly decreased to provide an under-torque situation.

If the power turbine wheel 16 is free or unconnected to the gas generator turbine wheel 12, the augmentation fuel control valve 34 is also responsive to a shut-off governor 52 suitably associated operatively with output shaft 18 and the valve 34. Thus, speed of the power turbine wheel 16 is limited to a maximum r.p.m. and overspeeding is prevented. If this maximum speed is tended to be exceeded the governor 52 will operate to close valve 34 and cut off the supply of auxiliary drive fluid to nozzle 30.

The governor 52 is also preferably operatively associated with the gas generator fuel control valve 20 to close down the supply of main drive fluid when the power turbine wheel 16 tends to overspeed.

If the power turbine wheel 16 is connected to the gas generator turbine wheel 12 as by the shaft 19, the governor 52 will be unnecessary since the governor 23 will control the tendency of the power output shaft 18 to overspeed, by reducing the main fuel supplied to the burner 14. The power augmentation of the auxiliary drive fluid will be a fraction of the turbine power developed by the main fuel, typically 20% of sea level military rated power although it can be more or less, so that if there tends to be over-speeding the supply of main fuel will be reduced or cut off even though the supply of augmentation fuel may continue. However, if desired, it may be arranged so that the augmentation fuel control valve 34 will be closed when the shaft of a fixed turbine engine tends to overspeed.

At this point, an advantage of a free turbine engine over a fixed turbine engine, both equipped with the power augmentation system of the present invention, should be mentioned. Instead of supplying considerable extra power to accelerate the compressor, the power augmentation system only supplies the torque necessary for the load and allows the more economical gas turbine engine cycle to accelerate the compressor.

From the foregoing, it will be seen that a turboshaft engine equipped with a power augmentation system constructed in accordance with the principles of the present invention can overcome the sensitivity of the gas turbine not so equipped to changes in both temperature and altitude. This will enable 100% power to be maintained in many situations. The length of time the auxiliary power is used is governed by the quantity of augmentation fuel available, the ability of the normal engine gases to cool the second stage turbine wheel and the operational temperature-stress level.

It will also be seen that the normally poor response of a turboshaft engine to throttle change can be overcome by admission of auxiliary drive fluid to the power turbine wheel in large quantities until the proper speed is obtained. At this speed, the automatic controls can stop the power burst or taper it down to allow for the slowly increasing output of the power section. Engine torque response, which normally takes a number of seconds, can be cut considerably to the millisecond range and is limited only by the amount of augmentation fuel carried and by fuel control valve response time, particularly in the case of a free turbine engine in which the auxiliary drive fluid impinges directly against the free turbine wheel and the compressor does not have to be accelerated as in the case of a fixed turbine engine.

It will also be apparent that when a turboshaft engine is already providing maximum output by conventional means, additional emergency shaft power can be obtained, in excess of engine rated power, by the impingement of the auxiliary drive fluid against the turbine wheel. The added power must be absorbed by the corresponding increase in load, such as by increasing the pitch of a helicopter rotor in the case where the engine is used in a helicopter, with no increase in r.p.m. since the engine is r.p.m. limited. While this may cause overheating and thus shorten the blade life if used for a long time, this emergency power will provide, notwithstanding, a considerable safety range for the helicopter. The torque limited control prevents overstressing of the turbine shaft and gearbox (not shown) which is present in an actual engine.

Further, in an aircraft such as a helicopter having a turboshaft engine, equipped with the power augmentation system of the present invention, should there be an engine failure, sufficient auxiliary drive fluid can be directed against the power turbine of the dead engine to provide sufficient power to land the ship. In a twin-engine helicopter, the auxiliary drive fluid could also be directed simultaneously against the power turbine wheel of the live engine. If the engines are of the free turbine type, the second stage turbine will not be penalized by compressor drag and less energy will be required. However, the turbine wheels of a dead engine may have to be rebladed as a result of prolonged full power boost because the blades may be overheated severely. This is considered to be a small price for saving the ship and the screw.

Still further, one or more engines of a multi-engine helicopter might be shut down during cruise in order to take advantage of lower specific fuel consumption of a turbine operating at nearly full power. The saving in fuel can be employed to extend the range of the ship. In addition, one engine operation during cruise would materially extend the life of the engines during overhaul. They would be in service a greater part of the time and maintenance costs would be reduced.

Referring to FIG. 2, the turbojet engine 10a there shown comprises an axial compressor 11a connected by the shaft 13a to a two-stage turbine including a first-stage turbine wheel 12a and a second stage turbine wheel 16a. It will be understood that both wheels 12a and 16a are non-rotatively fixed to each other and are fast to the shaft 13a which drives the compressor 11a. Intermediate the compressor and turbine is the burner 14a. The operation of the turbojet engine shown in FIG. 2 is similar to that described for the turboshaft engine shown in FIG. 1 except that the gases flowing through the turbojet engine are exhausted through a thrust nozzle 17a. Since the turbojet engine has no power output shaft, no torque measuring control for the augmentation fuel control valve 34a is required and hence is not shown in FIG. 2. Otherwise the main fuel control system and the augmentation fuel control system for the turbojet engine are the same as for the turboshaft engine shown in FIG. 1 and hence similar reference numerals have been employed to indicate like parts. It will be noted, however, that a direct communication between the governor 23 and the augmentation fuel control valve 34a is schematically shown in FIG. 2 by the line 23a. This line 23a is operative to transmit a signal to shut off the augmentation fuel control valve 34a when the turbine tends to overspeed as sensed by the maximum setting of the governor 23.

The advantages of the power augmentation system of present invention as applied to a turbojet engine, are experienced only if the turbine is operating below maximum permissible speed. When below maximum speed, the direction of auxiliary drive fluid through the nozzle 30 against the second stage turbine wheel 16a will provide extra thrust by increasing the speed of rotation of the compressor to provide more power. Also, the total effective thrust of the turbojet engine is increased by mass flow of the auxiliary drive fluid through the second-stage turbine wheel, by increasing the temperature of the gases within the tailpipe and by the burning of any unburned gases within the tailpipe.

To those skilled in the art, it will be apparent that many different types of components may be employed in the power augmentation system of the present invention. For example, a system may be designed to employ either mechanical components or electrical components or a combination of both. Accordingly, the scope of the invention is not to be determined by the illustrative forms of the invention diagrammatically shown but rather by the scope of the appended claims.

What is claimed is:

1. A method of augmenting the drive of a gas turbine once started and including a bladed turbine wheel normally driven by a main drive fluid flowed over the blades of said wheel, comprising the step of controllingly impinging a jet of auxiliary drive fluid derived from a source independent of that for said main drive fluid directly against said blades and so directed as to produce a torque on said wheel, said jet impinging said blades within the same area limits thereof normally engaged by said main drive fluid and serving to drive said wheel as an impulse turbine.

2. In a gas turbine including a bladed turbine wheel normally driven by a main drive fluid flowed over the blades of said wheel, the combination therewith of means for augmenting the drive of said wheel, comprising valve means connected to a source of augmentation fuel and having an outlet, means providing an auxiliary drive fluid generating chamber connected to said outlet, nozzle means independent of those for said main fluid connected to said chamber and arranged to jet auxiliary drive fluid generated from augmentation fuel in said chamber into direct impingement against said blades within the same area limits thereof normally engaged by said main drive fluid to drive said wheel as an impulse turbine, and control means operatively associated with said valve means for controlling the flow of augmentation fuel through said outlet.

3. In a gas turbine including selectively adjustable throttle means and a bladed turbine wheel normally driven by a main drive fluid flowed over the blades of said wheel, the combination therewith of means for augmenting the drive of said wheel, comprising valve means connected to a source of augmentation fuel and having an outlet, means providing an auxiliary drive fluid generating chamber connected to said outlet, nozzle means independent of those for said main fluid connected to said chamber and arranged to jet auxiliary drive fluid generated from augmentation fuel in said chamber into direct impingement against said blades within the same area limits thereof normally engaged by said main drive fluid to drive said wheel as an impulse turbine, and valve control means operatively associated with said valve means for controlling the flow of augmentation fuel through said outlet, said valve control means including rate sensing means responsive to the rate of change of adjustment of said throttle means.

4. In a gas turbine including selectively adjustable throttle means and a bladed turbine wheel normally driven by a main drive fluid flowed over the blades of said wheel, the combination therewith of means for augmenting the drive of said wheel, comprising valve means connected to a source of augmentation fuel and having an outlet, means providing an auxiliary drive fluid generating chamber connected to said outlet, nozzle means independent of those for said main fluid connected to said chamber and arranged to jet auxiliary drive fluid generated from augmentation fuel in said chamber into direct impingement against said blades within the same area limits thereof normally engaged by said main drive fluid to drive said wheel as an impulse turbine, and valve control means operatively associated with said valve means for controlling the flow of augmentation fuel through said outlet, said valve control means including rate sensing means responsive to the rate of change of adjustment of said throttle means and also including valve cut-off means responsive to a maximum predetermined angular speed of said wheel.

5. In a gas turbine including selectively adjustable throttle means and a bladed turbine wheel normally driven by a main drive fluid flowed over the blades of said wheel, the combination therewith of means for augmenting the drive of said wheel, comprising valve means connected to a source of augmentation fuel and having an outlet, means providing an auxiliary drive fluid generating chamber connected to said outlet, nozzle means independent of those for said main fluid connected to said chamber and arranged to jet auxiliary drive fluid generated from augmentation fuel in said chamber into direct impingement against said blades within the same area limits thereof normally engaged by said main drive fluid to drive said wheel as an impulse turbine, and valve control means operatively associated with said valve means for controlling the flow of augmentation fuel through said outlet, said valve control means including rate sensing means responsive to the rate of change of adjustment of said throttle means, selectively operable valve opening means and valve cut-off means responsive to a maximum predetermined angular speed of said turbine wheel.

6. In a gas turbine of the turboshaft type including a bladed turbine wheel fast to an output shaft and normally driven by a main drive fluid flowed over the blades of said wheel, the combination therewith of means for augmenting the drive of said wheel, comprising valve means connected to a source of augmentation fuel and having an outlet, means providing an auxiliary drive fluid generating chamber connected to said outlet, nozzle means independent of those for said main fluid connected to said chamber and arranged to jet auxiliary drive fluid generated from augmentation fuel in said chamber into direct impingement against said blades within the same area limits thereof normally engaged by said main drive fluid to drive said wheel as an impulse turbine, and valve control means operatively associated with said valve means for controlling the flow of augmentation fuel through said outlet, said valve control means including torque measuring means responsive to the torque of said shaft.

7. In a gas turbine of the turboshaft type including selectively adjustable throttle means and a bladed turbine wheel normally driven by a main drive fluid flowed over the blades of said wheel, the combination therewith of means for augmenting the drive of said wheel, comprising valve means connected to a source of augmentation fuel and having an outlet, means providing an auxiliary drive fluid generating chamber connected to said outlet, nozzle means independent of those for said main fluid connected to said chamber and arranged to jet auxiliary drive fluid generated from augmentation fuel in said chamber into direct impingement against said blades within the same area limits thereof normally engaged by said main drive fluid to drive said wheel as an impulse turbine, and valve control means operatively associated with said valve means for controlling the flow of augmentation fuel through said outlet, said valve control means including torque measuring means responsive to the torque of said shaft, rate sensing means responsive to the rate of change of adjustment of said throttle means, selectively operable valve opening means and valve cut-off means responsive to a maximum predetermined angular speed of said wheel.

8. In a gas turbine including a gas generator and a bladed free power turbine wheel fast to an output shaft and normally driven by a main drive fluid flowed over the blades of said wheel, the combination therewith of means for augmenting the drive of said wheel, comprising valve means connected to a source of auxiliary drive fluid independent of that for said main fluid and controlling the flow of said auxiliary fluid, means for jetting such auxiliary flow into direct impingement against said blades within the same area limits thereof normally engaged by said main drive fluid to drive said wheel as an impulse turbine, and valve control means operatively associated with said valve means to regulate said auxiliary flow.

References Cited in the file of this patent

UNITED STATES PATENTS

| | | |
|---|---|---|
| 1,988,456 | Lysholm | Jan. 22, 1935 |
| 2,544,235 | Pfenninger | Mar. 6, 1951 |
| 2,619,163 | Wynne et al. | Nov. 25, 1952 |
| 2,687,779 | Peterson | Aug. 31, 1954 |
| 2,795,107 | Haworth et al. | June 11, 1957 |
| 2,937,491 | Howell | May 24, 1960 |
| 2,982,095 | Campbell | May 2, 1961 |

FOREIGN PATENTS

| | | |
|---|---|---|
| 451,838 | France | Feb. 21, 1913 |
| 1,112,882 | France | Nov. 23, 1955 |